United States Patent
Kashiwagi et al.

(10) Patent No.: US 9,442,315 B2
(45) Date of Patent: Sep. 13, 2016

(54) LIQUID CRYSTAL LENS DEVICE AND IMAGE DISPLAY APPARATUS INCLUDING THE SAME

(71) Applicant: KABUSHIKI KAISHA TOSHIBA, Minato-ku, Tokyo (JP)

(72) Inventors: Masako Kashiwagi, Kanagawa-ken (JP); Shinichi Uehara, Tokyo (JP); Ayako Takagi, Kanagawa-ken (JP); Yoshiharu Momonoi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 13/875,725

(22) Filed: May 2, 2013

(65) Prior Publication Data

US 2014/0049709 A1 Feb. 20, 2014

(30) Foreign Application Priority Data

Aug. 17, 2012 (JP) .................................. 2012-181227

(51) Int. Cl.
*G02F 1/133* (2006.01)
*G02F 1/29* (2006.01)
(Continued)

(52) U.S. Cl.
CPC ............. *G02F 1/13306* (2013.01); *G02F 1/29* (2013.01); *G02B 27/2214* (2013.01); *G02F 2001/294* (2013.01); *H04N 13/0404* (2013.01); *H04N 13/0454* (2013.01)

(58) Field of Classification Search
CPC ................... G09G 3/3233; G09G 2300/0861; G09G 2320/0233; G09G 2330/021; G09G 2310/0278; G09G 2300/042
See application file for complete search history.

(56) References Cited

U.S. PATENT DOCUMENTS

| 2011/0199548 A1 | 8/2011 | Takama |
| 2012/0069255 A1 | 3/2012 | Takagi et al. |
| 2013/0258219 A1 | 10/2013 | Takagi et al. |

FOREIGN PATENT DOCUMENTS

| CN | 101395523 A | 3/2009 |
| CN | 101571656 A | 11/2009 |

(Continued)

OTHER PUBLICATIONS

Notification of Reason(s) for Refusal issued by the Japanese Patent Office on Jun. 10, 2014, for Japanese Patent Application No. 2012-181227, and English-language translation thereof.

(Continued)

*Primary Examiner* — Huyen Ngo
(74) *Attorney, Agent, or Firm* — Finnegan, Henderson, Farabow, Garrett & Dunner LLP

(57) ABSTRACT

A liquid crystal lens device and an image display apparatus are disclosed. According to certain embodiments, the liquid crystal lens device includes a liquid crystal optical unit and a drive unit. The liquid crystal optical unit includes a first substrate unit having a plurality of first electrodes and a plurality of second electrodes, and a second substrate unit having a first opposing electrode. The drive unit controls voltages between the first electrodes and the first opposing electrode and between the second electrodes and the first opposing electrode by changing the voltage between the second electrodes and the first opposing electrode from a third voltage to a fourth voltage after changing the voltage between the first electrodes and the first opposing electrode from a first voltage to a second voltage. In some embodiments, the liquid crystal lens device is included in the image display apparatus along with an image display unit.

9 Claims, 9 Drawing Sheets

(51) Int. Cl.
    *G02B 27/22*     (2006.01)
    *H04N 13/04*     (2006.01)

(56) References Cited

FOREIGN PATENT DOCUMENTS

| JP | 3940725 | 4/2007 |
|----|---------|--------|
| JP | 2009-528558 | 8/2009 |
| JP | 2011-164527 | 8/2011 |
| WO | WO 2007-098602 A1 | 9/2007 |
| WO | WO 2012/073324 A1 | 6/2012 |

OTHER PUBLICATIONS

Decision of Refusal issued by the Japanese Patent Office on Jan. 9, 2015, for Japanese Patent Application No. 2012-181227, and English-language translation thereof.

Extended European Search Report issued by the European Patent Office on Jan. 7, 2014, for European Patent Application No. 13166150.6.

Notification of the First Office Action issued by the State Intellectual Property Office of the People's Republic of China on Aug. 3, 2015, for Chinese Patent Application No. 201310195759.5, and English-language translation thereof.

LIQUID CRYSTAL LENS DEVICE AND IMAGE DISPLAY APPARATUS INCLUDING THE SAME

CROSS-REFERENCE TO RELATED APPLICATIONS

This application is based upon and claims the benefit of priority from the prior Japanese Patent Application No. 2012-181227, filed on Aug. 17, 2012; the entire contents of which are incorporated herein by reference.

FIELD

Embodiments described herein relate generally to a liquid crystal lens device, an image display apparatus, and a drive device.

BACKGROUND

There is a liquid crystal lens device including a liquid crystal optical unit that changes the distribution of the refractive index according to the application of a voltage by utilizing the birefringence of liquid crystal molecules. There is a drive device for driving the liquid crystal optical unit. Also, there is an image display apparatus that combines the liquid crystal lens device and the image display unit.

By changing the distribution of the refractive index of the liquid crystal optical unit, the image display apparatus switches between a state in which the image displayed by the image display unit is caused to be incident on the eyes of a human viewer as displayed by the image display unit and a state in which the image displayed by the image display unit is caused to be incident on the eyes of the human viewer as multiple parallax images. Thereby, a two-dimensional image display operation and a three-dimensional image display operation are realized. High display quality is necessary for such an image display apparatus.

DETAILED DESCRIPTION

Figure 1:
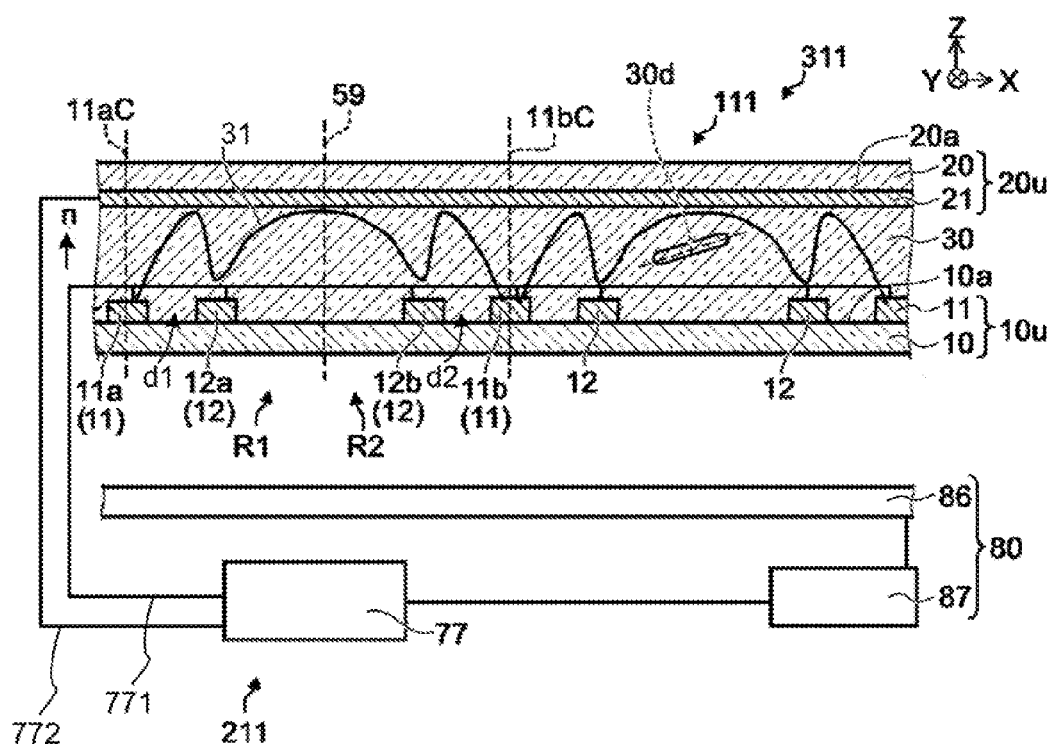
FIG. 1 is a schematic cross-sectional view showing a liquid crystal lens device and an image display apparatus according to a first embodiment.

According to one embodiment, a liquid crystal lens device includes a liquid crystal optical unit and a drive unit. The liquid crystal optical unit includes a first substrate unit, a second substrate unit, and a liquid crystal layer. The first substrate unit includes a first substrate, a plurality of first electrodes, and a plurality of second electrodes. The first substrate has a first major surface. Each of the first electrodes is provided on the first major surface to extend in a first direction. Each of the first electrodes is arranged in a direction non-parallel to the first direction. Each of the second electrodes is provided on the first major surface between the first electrodes to extend in the first direction. Each of the second electrodes is separated from the first electrodes in a second direction perpendicular to the first direction. The second substrate unit includes a second substrate and a first opposing electrode. The second substrate has a second major surface. The second major surface opposes the first major surface. The first opposing electrode is provided on the second major surface. The liquid crystal layer is provided between the first substrate unit and the second substrate unit. The drive unit is configured to control a voltage between the first electrode and the first opposing electrode and a voltage between the second electrode and the first opposing electrode. The drive unit changes the voltage between the second electrode and the first opposing electrode from a third voltage to a fourth voltage after changing the voltage between the first electrode and the first opposing electrode from a first voltage to a second voltage. The absolute value of the second voltage is greater than the absolute value of the first voltage. The absolute value of the fourth voltage is greater than the absolute value of the third voltage.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view showing a liquid crystal lens device and an image display apparatus according to a first embodiment.

As shown in FIG. 1, the image display apparatus 311 according to the embodiment includes the liquid crystal lens device 211 and an image display unit 80. The image display unit 80 may include any display device. For example, a liquid crystal display device, an organic EL display device, a plasma display, etc., may be used.

The liquid crystal lens device 211 includes a liquid crystal optical unit 111 and a drive unit 77.

The liquid crystal optical unit 111 includes a first substrate unit 10u, a second substrate unit 20u, and a liquid crystal layer 30.

The first substrate unit 10u includes a first substrate 10, multiple first electrodes 11, and multiple second electrodes 12.

The first substrate 10 has a first major surface 10a. The multiple first electrodes 11 are provided on the first major surface 10a. Each of the multiple first electrodes 11 extends in the first direction. The multiple first electrodes 11 are arranged in a direction that intersects the first direction. In FIG. 1, three of the multiple first electrodes 11 are shown. The number of the multiple first electrodes 11 is arbitrary.

The first direction is taken as a Y-axis direction. A direction parallel to the major surface 10a and perpendicular to the Y-axis direction is taken as an X-axis direction. A direction perpendicular to the X-axis direction and the Y-axis direction is taken as a Z-axis direction.

The multiple first electrodes 11 are arranged along, for example, the X-axis direction.

Two most proximal first electrodes 11 of the multiple first electrodes 11 will now be focused upon. One of the two most proximal first electrodes 11 is taken as a first major electrode 11a. The other of the two most proximal first electrodes 11 is taken as a second major electrode 11b.

A central axis 59 is between the most proximal first electrodes 11 (e.g., the first major electrode 11a and the second major electrode 11b). The central axis 59 is parallel to the Y-axis direction and passes through a midpoint of a line segment connecting a center 11aC in the X-axis direction of the first major electrode 11a to a center 11bC in the X-axis direction of the second major electrode 11b when projected onto the X-Y plane (a plane parallel to the first major surface 10a).

The region of the first major surface 10a between the central axis 59 and the first major electrode 11a which is the one of the two most proximal first electrodes 11 is taken as a first region R1. The region of the first major surface 10a between the central axis 59 and the second major electrode 11b which is the other of the two most proximal first electrodes 11 is taken as a second region R2. The direction from the first major electrode 11a toward the second major electrode 11b is taken to be the +X direction. The direction from the second major electrode 11b toward the first major electrode 11a corresponds to the −X direction.

Each of the multiple second electrodes 12 is provided between the multiple first electrodes 11 on the first substrate 10. The multiple second electrodes 12 extend in the Y-axis direction. The multiple second electrodes 12 are separated from the multiple first electrodes 11 in the X-axis direction. In this example, at least a first sub electrode 12a and a second sub electrode 12b are provided as the second electrodes 12.

The first sub electrode 12a of the multiple second electrodes 12 is provided on the first major surface 10a in the first region R1; and the second sub electrode 12b of the multiple second electrodes 12 is provided on the first major surface 10a in the second region R2.

The second substrate unit 20u includes a second substrate 20 and an opposing electrode (a first opposing electrode) 21. The second substrate 20 has a second major surface 20a opposing the first major surface 10a. The opposing electrode 21 is provided on the second major surface 20a.

The first substrate 10, the first electrodes 11, the second electrodes 12, the second substrate 20, and the opposing electrode 21 are transmissive to light. Specifically, these components are transparent.

The first substrate 10 and the second substrate 20 may include, for example, a transparent material such as glass, a resin, etc. The first substrate 10 and the second substrate 20 have plate configurations or sheet configurations. The thickness of the first substrate 10 and the thickness of the second substrate 20 are, for example, not less than 50 micrometers (μm) and not more than 2000 μm. However, the thicknesses are arbitrary.

The first electrodes 11, the second electrodes 12, and the opposing electrode 21 include, for example, an oxide including at least one (one type) of element selected from the group consisting of In, Sn, Zn, and Ti. These electrodes may include, for example, ITO. For example, at least one selected from $In_2O_3$ and $SnO_3$ may be used. The thicknesses of these electrodes are, for example, about 200 nanometers (nm) (e.g., not less than 100 nm and not more than 350 nm). The thicknesses of the electrodes are set to be, for example, thicknesses to obtain a high transmittance with respect to visible light.

The disposition pitch of the first electrodes 11 (the distance between the X-axis direction centers of the most proximal first electrodes 11) is, for example, not less than 10 μm and not more than 1000 μm. The disposition pitch is set to match the desired specifications (the characteristics of the gradient index lens described below). The lengths (the widths) of the first electrode 11 and the second electrode 12 along the X-axis direction are, for example, not less than 5 μm and not more than 300 μm.

In this example, the second electrodes 12 are adjacent to the first electrodes 11. More specifically, the first sub electrode 12a is adjacent to the first major electrode 11a; and the second sub electrode 12b is adjacent to the second major electrode 11b. The distance d1 along the X-axis direction between the first major electrode 11a and the first sub electrode 12a and the distance d2 along the X-axis direction between the second major electrode 11b and the second sub electrode 12b are, for example, not less than 5 μm and not more than 150 μm.

The liquid crystal layer 30 is provided between the first substrate unit 10u and the second substrate unit 20u. The liquid crystal layer 30 includes a liquid crystal material. The liquid crystal material may include a nematic liquid crystal (having a nematic phase at the temperature of use of the liquid crystal optical unit 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment.

The length (the thickness) of the liquid crystal layer 30 along the Z-axis direction is, for example, not less than 20 μm and not more than 50 μm. In this example, the thickness of the liquid crystal layer 30 is 30 μm. In other words, the thickness of the liquid crystal layer 30 is the distance along the Z-axis direction between the first substrate unit 10u and the second substrate unit 20u.

The alignment of the liquid crystal of the liquid crystal layer 30 may have a pretilt. In the pretilt, for example, a director 30d of the liquid crystal is oriented from the first substrate unit 10u toward the second substrate unit 20u along the +X direction from the first major electrode 11a toward the second major electrode 11b.

The pretilt angle is the angle between the X-Y plane and the director 30d (the axis of the liquid crystal molecules in the long-axis direction) of the liquid crystal. In the case of the horizontal alignment, the pretilt angle is, for example, less than 45° and greater than 0°. In the vertical alignment, the pretilt angle is, for example, less than 90° and greater than 45°.

For convenience in the specification, the horizontal alignment refers to the case where the pretilt angle is less than 45°; and for convenience, the vertical alignment refers to the case where the pretilt angle is greater than 45°.

For example, the direction of the pretilt can be determined by a crystal rotation method, etc. Also, the alignment of the liquid crystal is changed by applying a voltage to the liquid crystal layer 30. The optical characteristics of the liquid crystal layer 30 at this time are observed. The direction of the pretilt can be determined by such a method as well.

In the case where alignment processing of the first substrate unit 10u is performed by, for example, rubbing, etc., the direction of the alignment processing is along the +X direction. In this example, the direction of the alignment processing of the first substrate unit 10u is, for example, the +X direction.

The axis of the director 30d may be parallel to the +X direction or non-parallel to the +X direction when the director 30d of the liquid crystal is projected onto the X-Y plane. The direction of the pretilt has a +X direction component when projected onto the X axis.

The alignment direction of the liquid crystal layer 30 proximal to the second substrate unit 20u is antiparallel to the alignment direction of the liquid crystal layer 30 proximal to the first substrate unit 10u. In this example, the direction of the alignment processing of the second substrate unit 20u is the −X direction. In other words, the initial alignment is not a splay alignment.

The first substrate unit 10u may further include an alignment film (not shown). The multiple first electrodes 11 and the multiple second electrodes 12 are disposed between the first substrate 10 and the alignment film of the first substrate unit 10u. The second substrate unit 20u may further include an alignment film (not shown). The opposing electrode 21 is disposed between the second substrate 20 and the alignment film of the second substrate unit 20u. These alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The case will now be described where the dielectric anisotropy of the liquid crystal included in the liquid crystal layer 30 is positive and the initial alignment is the horizontal alignment.

The liquid crystal alignment of the liquid crystal layer 30 is changed by applying voltages between the opposing electrode 21 and the first electrodes 11 and between the opposing electrode 21 and the second electrodes 12. A refractive index distribution is formed in the liquid crystal layer 30 according to this change; and the travel direction of the light that is incident on the liquid crystal optical unit 111 is changed by the refractive index distribution. The change of the travel direction of the light is mainly based on the refraction effect.

The image display unit 80 includes a display unit 86. The display unit 86 is stacked with the liquid crystal optical unit 111. The display unit 86 emits light including image information to be incident on the liquid crystal layer 30. The image display unit 80 may further include a display control unit 87 that controls the display unit 86. The display unit 86 produces light that is modulated based on the signal supplied from the display control unit 87 to the display unit 86. For example, the display unit 86 emits light that includes multiple parallax images. As described below, the liquid crystal optical unit 111 has an operating state in which the optical path is modified, and an operating state in which the optical path is substantially not modified. For example, the image display apparatus 311 provides a three-dimensional display by the light being incident on the liquid crystal optical unit 111 in the operating state in which the optical path is modified. The image display apparatus 311 provides, for example, a two-dimensional image display in the operating state in which, for example, the optical path is substantially not modified.

The drive unit 77 may be connected to the display control unit 87 by a wired or wireless method (an electrical method, an optical method, etc.). The image display apparatus 311 may further include a control unit (not shown) that controls the drive unit 77 and the display control unit 87.

The drive unit 77 is electrically connected to the first electrodes 11 and the second electrodes 12 through line 771, and the opposing electrode 21 through line 772.

The drive unit 77 applies a first voltage V1 and a second voltage V2 between the first electrode 11 and the opposing electrode 21. The absolute value of the second voltage V2 is greater than the absolute value of the first voltage V1. The voltage between the first electrode 11 and the opposing electrode 21 is controlled between the first voltage V1 and the second voltage V2 by the drive unit 77.

The drive unit 77 applies a third voltage V3 and a fourth voltage V4 between the second electrode 12 and the opposing electrode 21. The absolute value of the fourth voltage V4 is greater than the absolute value of the third voltage V3. The voltage between the second electrode 12 and the opposing electrode 21 is controlled between the third voltage V3 and the fourth voltage V4 by the drive unit 77. The drive unit 77 causes the absolute value of the second voltage V2 to be greater than the absolute value of the fourth voltage V4. The second voltage V2 is, for example, 6 V; and the fourth voltage V4 is, for example, 3 V.

For convenience in the specification, the state in which the potential is the same (is zero volts) between two electrodes also is taken to be included in the state in which the voltage is applied. For example, the first voltage V1 and the third voltage V3 may be zero volts. The first voltage V1 may be the state in which the voltage is not applied between the first electrode 11 and the opposing electrode 21. The third voltage V3 may be the state in which the voltage is not applied between the second electrode 12 and the opposing electrode 21.

The first voltage V1 to the fourth voltage V4 may be direct-current voltages or alternating current voltages. In the case where alternating current voltages are used, the effective value of the second voltage V2 is greater than the effective value of the first voltage V1. The effective value of the fourth voltage V4 is greater than the effective value of the third voltage V3. The effective value of the second voltage V2 is greater than the effective value of the fourth voltage V4.

For example, the polarities of the first voltage V1 to the fourth voltage V4 may change periodically. For example, the potential of the opposing electrode 21 may be fixed and the potential of the first electrode 11 or the potential of the second electrode 12 may be changed as alternating current. The polarity of the potential of the opposing electrode 21 may be changed periodically; and the potential of the first electrode 11 or the potential of the second electrode 12 may be changed in conjunction with the change of the polarity of the potential of the opposing electrode 21 but with an opposite polarity. In other words, common inversion driving may be performed. Thereby, the power supply voltage of the drive circuit can be reduced; and the breakdown voltage specifications of the drive IC are relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the second voltage V2 and the fourth voltage V4 are set to be greater than the threshold voltage Vth. The liquid crystal alignment of the liquid crystal layer 30 is changed by the application of the second voltage V2 and the fourth voltage V4.

An alignment in which the tilt angle of the liquid crystal is large (e.g., the vertical alignment) is formed in the liquid crystal layer 30 in the regions where the second voltage V2 and the fourth voltage V4 are applied. The effective refractive index of these regions approaches the refractive index ($n_o$) with respect to ordinary light.

On the other hand, a voltage is not applied along the Z-axis direction in the region between the first major electrode 11a and the first sub electrode 12a, the region between the first sub electrode 12a and the second sub electrode 12b, and the region between the second sub electrode 12b and the second major electrode 11b. The initial alignment (e.g., the horizontal alignment) or an alignment that is near the initial alignment is formed in these regions. The refractive index of these regions with respect to the light that vibrates in the X-axis direction approaches the refractive index ($n_e$) with respect to extraordinary light. Thereby, a refractive index distribution 31 is formed in the liquid crystal layer 30.

In the refractive index distribution 31, for example, the change of the refractive index is not less than about 20% and not more than about 80% of the difference between the refractive index for extraordinary light and the refractive index for ordinary light. In this example, for example, the refractive index distribution 31 has a configuration corresponding to the distribution of the thickness of a Fresnel lens. The liquid crystal optical unit 111 functions as a liquid crystal GRIN lens (Gradient Index lens) in which the refractive index changes in the plane. A lens array that has optical characteristics having a lenticular configuration is formed in the liquid crystal optical unit 111.

In the refractive index distribution 31 that is formed, the position of the central axis 59 corresponds to the position of the lens center; and the positions of the first major electrode 11a and the second major electrode 11b correspond to the positions of the lens ends.

For example, in the liquid crystal optical unit 111, the operating state in which the optical path is modified is obtained when the second voltage V2 and the fourth voltage V4 are applied. The operating state in which the optical path is substantially not modified is obtained when the first voltage V1 and the third voltage V3 are not applied.

FIG. 2A to FIG. 2D are graphs showing characteristics of the liquid crystal lens device and the image display apparatus according to the first embodiment.

Figure 2A:
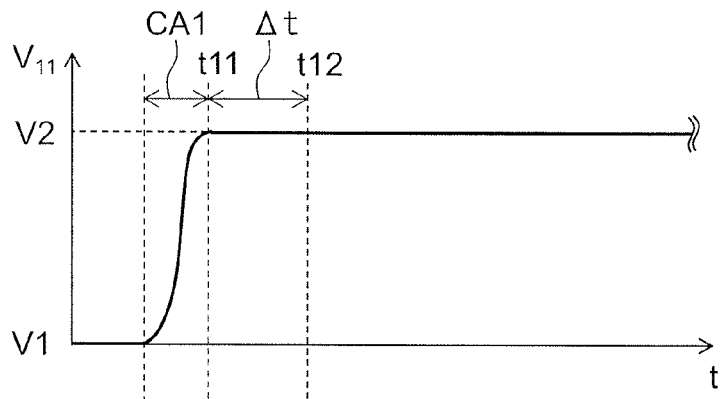
FIG. 2A to FIG. 2D are graphs showing characteristics of the liquid crystal lens device and the image display apparatus according to the first embodiment.

In FIG. 2A, the vertical axis is a voltage $V_{11}$ applied between the first electrode 11 and the opposing electrode 21; and the horizontal axis is a time t.

Figure 2B:
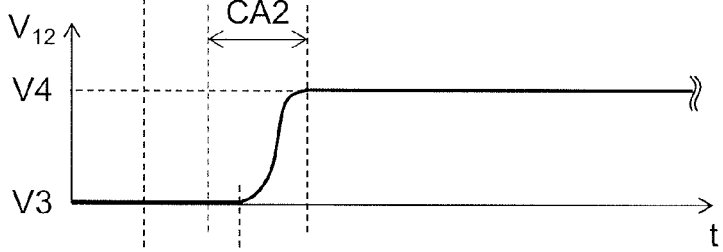

In FIG. 2B, the vertical axis is a voltage $V_{12}$ applied between the second electrode 12 and the opposing electrode 21; and the horizontal axis is the time t.

Figure 2C:
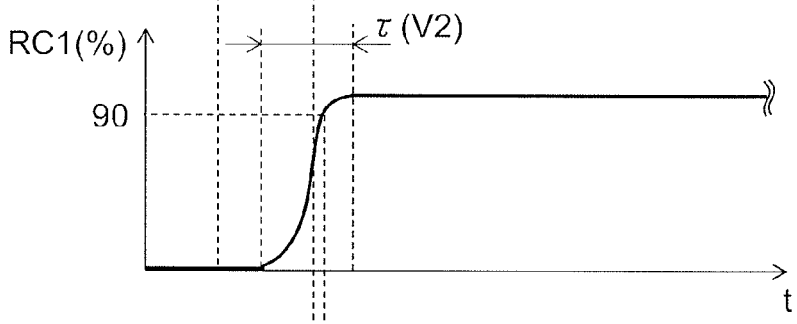

In FIG. 2C, the vertical axis is a change rate RC1(%) of the alignment of the liquid crystal of the liquid crystal layer 30 due to the application of the second voltage V2; and the horizontal axis is the time t.

Figure 2D:
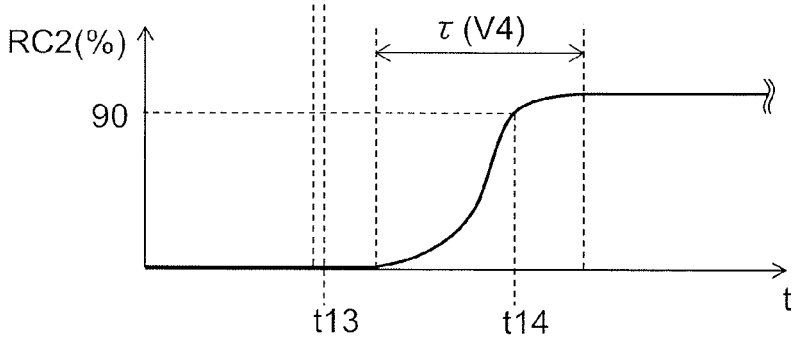

In FIG. 2D, the vertical axis is a change rate RC2(%) of the alignment of the liquid crystal of the liquid crystal layer 30 due to the application of the fourth voltage V4; and the horizontal axis is the time t.

As shown in FIG. 2A and FIG. 2B, the drive unit 77 forms the refractive index distribution 31 in the liquid crystal layer 30 by changing the voltage $V_{11}$ between the first electrode 11 and the opposing electrode 21 from the first voltage V1 to the second voltage V2 and changing the voltage $V_{12}$ between the second electrode 12 and the opposing electrode 21 from the third voltage V3 to the fourth voltage V4. In the case where the refractive index distribution 31 is formed, the drive unit 77 starts the application of the fourth voltage V4 after starting the application of the second voltage V2. Namely, the drive unit 77 changes the voltage between the second electrode 12 and the first opposing electrode 21 from the third voltage V3 to the fourth voltage V4 after changing the voltage between the first electrode 11 and the first opposing electrode 21 from the first voltage V1 to the second voltage V2.

The interval of the change between the first voltage V1 and the second voltage V2 corresponds to a first change interval CA1. In the first change interval CA1, the voltage $V_{11}$ changes continuously from the first voltage V1 toward the second voltage V2. The interval of the change between the third voltage V3 and the fourth voltage V4 corresponds to a second change interval CA2. In the second change interval CA2, the voltage $V_{12}$ changes continuously from the third voltage V3 toward the fourth voltage V4.

The start of the application of the second voltage V2 is, for example, a timing t11 when the first change interval CA1 ends and the voltage $V_{11}$ reaches the second voltage V2. The start of the application of the fourth voltage V4 is, for example, a timing t12 when the second change interval CA2 ends and the voltage $V_{12}$ reaches the fourth voltage V4. The drive unit 77 provides the timing t12 after the timing t11. The drive unit 77 provides the second change interval CA2 after the first change interval CA1.

The change rate RC1 of the alignment (the initial alignment) of the liquid crystal of the liquid crystal layer 30 when the first voltage V1 is applied is 0%. The alignment of the liquid crystal of the liquid crystal layer 30 when the second voltage V2 is applied is 100%. For example, the degree of the alignment can be expressed by the integral in the thickness direction of the long-axis direction (the director) of the liquid crystal layer 30, etc.

FIG. 2C shows the change of the alignment of the liquid crystal when the voltage $V_{11}$ is changed from the first voltage V1 to the second voltage V2.

The change rate RC2 of the alignment (the initial alignment) of the liquid crystal of the liquid crystal layer 30 when the third voltage V3 is applied is 0%. The alignment of the liquid crystal of the liquid crystal layer 30 when the fourth voltage V4 is applied is 100%.

FIG. 2D shows the change of the alignment of the liquid crystal when the voltage $V_{12}$ is changed from the third voltage V3 to the fourth voltage V4.

As shown in FIG. 2C and FIG. 2D, the drive unit 77 changes the alignment of the liquid crystal due to the application of the fourth voltage V4 after the change of the alignment of the liquid crystal due to the application of the second voltage V2. For example, a timing t13 when the change rate RC1 of the alignment reaches 90% and a timing t14 when the change rate RC2 of the alignment reaches 90% are compared. In such a case, the drive unit 77 sets the timing t14 to be after the timing t13.

The response time τ(V2) (seconds) of the change of the alignment of the liquid crystal of the liquid crystal layer 30 due to the application of the second voltage V2 (volts) is represented by Formula (1).

[Formula 1]

$$\tau(V2) = \frac{d^2\gamma}{\varepsilon_0 \Delta\varepsilon V2^2 - \pi^2 K} \quad (1)$$

In Formula (1), the thickness d (meters) of the liquid crystal layer 30, the rotational viscosity coefficient γ (pascals·seconds) of the liquid crystal included in the liquid crystal layer 30, the dielectric constant $\varepsilon_0$ of a vacuum (farads/meter), the absolute value Δ∈ of the dielectric anisotropy of the liquid crystal layer 30, and an elasticity modulus K (newtons) of the splay are used.

The response time τ(V4) (seconds) of the change of the alignment of the liquid crystal of the liquid crystal layer 30 due to the application of the fourth voltage V4 (volts) is represented by Formula (2).

[Formula 2]

$$\tau(V4) = \frac{d^2\gamma}{\varepsilon_0 \Delta\varepsilon V4^2 - \pi^2 K} \quad (2)$$

As shown in Formula (1) and Formula (2), the response time τ(V2) and the response time τ(V4) depend on the second voltage V2 and the fourth voltage V4 that are applied. Specifically, the response time shortens as the voltage that is applied increases. Accordingly, in this example, the response time τ(V2) is shorter than the response time τ(V4).

Thus, the absolute value of the second voltage V2 is greater than the absolute value of the fourth voltage V4. The application of the fourth voltage V4 is started after starting the application of the second voltage V2. Thereby, the alignment of the liquid crystal due to the application of the fourth voltage V4 can be changed after the change of the alignment of the liquid crystal due to the application of the second voltage V2.

A time difference Δt is set to satisfy the relationship of Δt≤τ(V4)−τ(V2), where the time difference between the start of the application of the second voltage V2 and the start of the application of the fourth voltage V4 is Δt (t12−t11). Thereby, the alignment of the liquid crystal due to the application of the fourth voltage V4 can be changed more reliably after the change of the alignment of the liquid crystal due to the application of the second voltage V2. In other words, Δt is a time difference between a timing of a change in the voltage between the first electrode 11 and the first opposing electrode 21 and a timing of change in the voltage between the second electrode 12 and the first opposing electrode 21.

Figure 3:
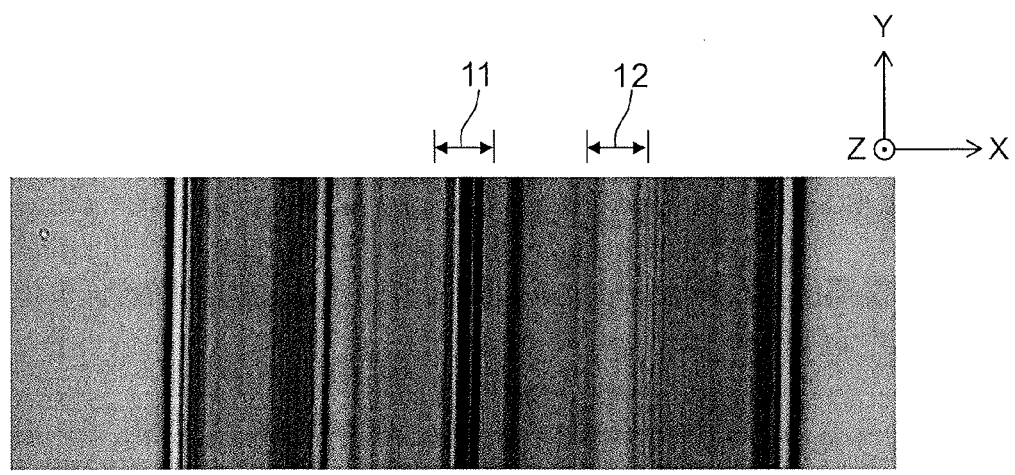
FIG. 3 is a photograph showing characteristics of the liquid crystal lens device and the image display apparatus according to the first embodiment.

FIG. 3 is a photograph showing characteristics of the liquid crystal lens device and the image display apparatus according to the first embodiment.

Figure 4:
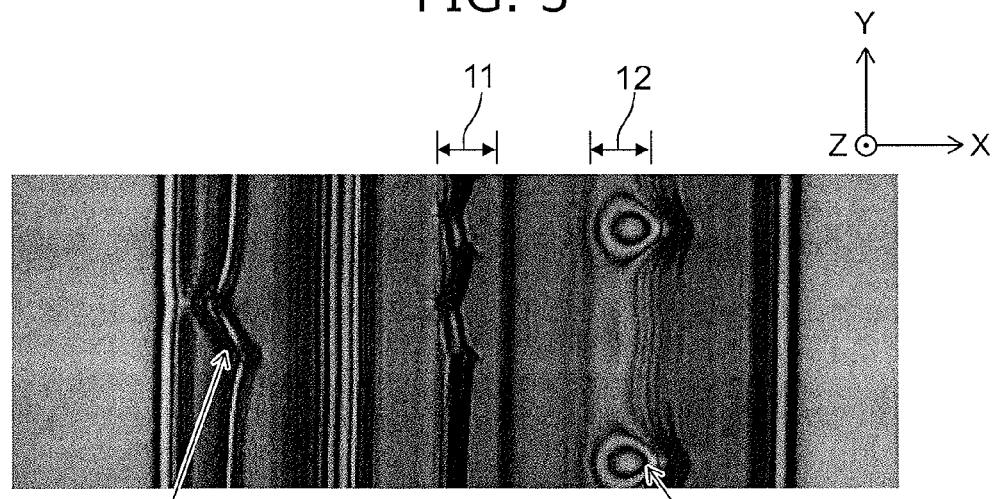
FIG. 4 is a photograph showing characteristics of a liquid crystal lens device and an image display apparatus of a reference example.

FIG. 4 is a photograph showing characteristics of a liquid crystal lens device and an image display apparatus of a reference example.

FIG. 3 and FIG. 4 are photographs showing the state in which the retardation distribution of the liquid crystal optical unit 111 is observed in the state in which the second voltage V2 and the fourth voltage V4 are applied.

For the observation in FIG. 3, the applications of the second voltage V2 and the fourth voltage V4 are performed by the driving method of the drive unit 77 according to the embodiment. In the driving method of the drive unit 77 according to the embodiment, as recited above, the alignment of the liquid crystal due to the application of the fourth voltage V4 is changed after the change of the alignment of the liquid crystal due to the application of the second voltage V2.

For the observation in FIG. 4, the applications of the second voltage V2 and the fourth voltage V4 are performed by a driving method of the drive unit of the reference example. In the driving method of the drive unit of the reference example, the change of the alignment of the liquid crystal due to the application of the second voltage V2 is substantially simultaneous to the change of the alignment of the liquid crystal due to the application of the fourth voltage V4. Or, the alignment of the liquid crystal due to the application of the second voltage V2 changes after the change of the alignment of the liquid crystal due to the application of the fourth voltage V4.

In the driving method of the reference example as shown in FIG. 4, for example, an alignment disorder AD of the liquid crystal is observed in portions of the liquid crystal layer 30 between the second electrode 12 and the opposing electrode 21, etc. In FIG. 4, for example, disclinations are observed as the alignment disorder AD.

Conversely, in the driving method according to the embodiment as shown in FIG. 3, the alignment disorder AD of the liquid crystal is suppressed compared to that of the driving method of the reference example. In FIG. 3, the alignment disorder AD is substantially not observed.

Thus, according to the liquid crystal lens device 211 and the image display apparatus 311 according to the embodiment, the occurrence of the alignment disorder AD such as disclinations, etc., can be suppressed; and high display quality can be obtained.

Figure 5:
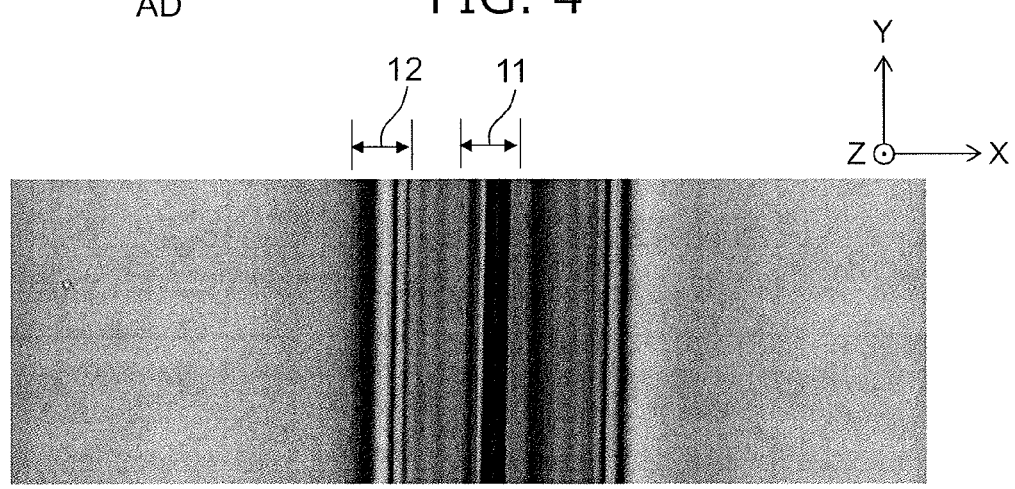
FIG. 5 is a photograph showing characteristics of the liquid crystal lens device and the image display apparatus according to the first embodiment.
Figure 6A:
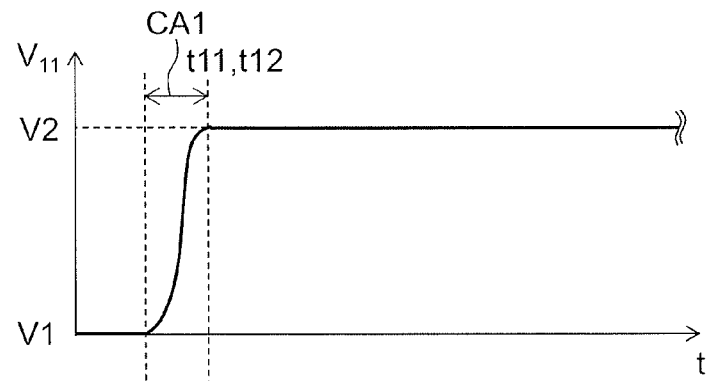
FIG. 6A to FIG. 6D are graphs showing other characteristics of the liquid crystal lens device and the image display apparatus according to the first embodiment.
Figure 6B:
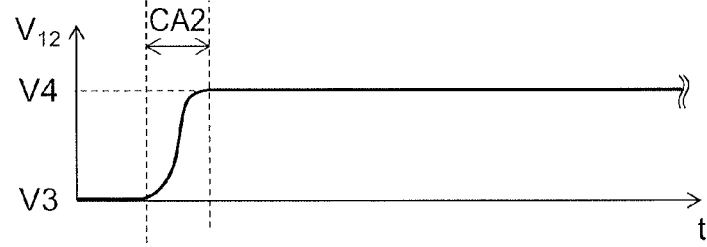
Figure 6C:
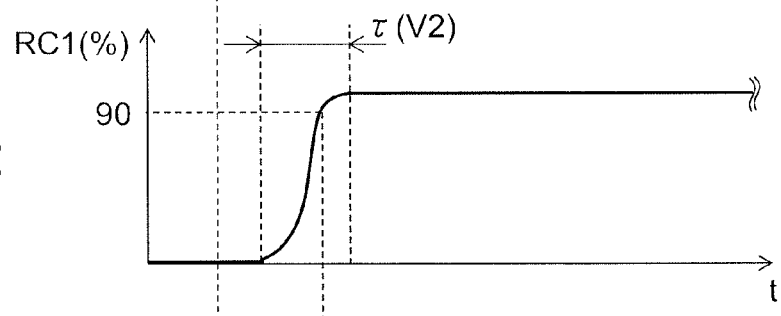
Figure 6D:
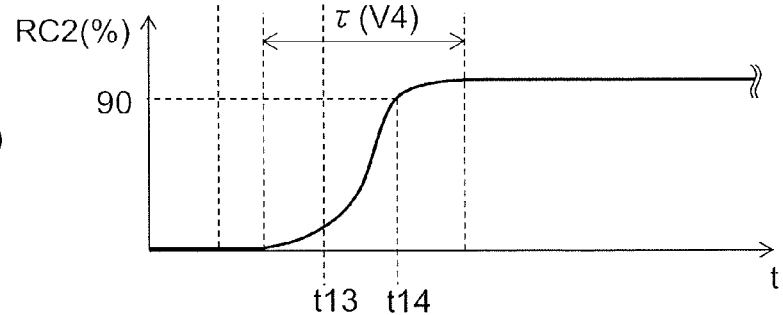

FIG. 5 is a photograph showing characteristics of the liquid crystal lens device and the image display apparatus according to the first embodiment.

FIG. 5 is a photograph showing the state in which the retardation distribution of the liquid crystal optical unit 111 is observed in the state in which the second voltage V2 and the third voltage V3 are applied. In other words, this is a photograph in which the state in which a high voltage is applied only between the first electrode 11 and the opposing electrode 21. (the state in which the potential difference between the first electrode 11 and the opposing electrode 21 is increased) is observed.

As shown in FIG. 5, when the high voltage is applied between the first electrode 11 and the opposing electrode 21, the electric field that is created by the first electrode 11 also affects the alignment of the liquid crystal between the second electrode 12 and the opposing electrode 21.

The fluctuation of the alignment of the liquid crystal is large in the state in which the first voltage V1 and the third voltage V3 are applied. In other words, the fluctuation of the alignment of the liquid crystal is large in the state in which the potential difference between the first electrode 11 and the opposing electrode 21 is small and the state in which the potential difference between the second electrode 12 and the opposing electrode 21 is small. When the potential difference between the first electrode 11 and the opposing electrode 21 is increased, the alignment of the liquid crystal of the liquid crystal layer 30 is matched between the first electrode 11 and the opposing electrode 21; and the alignment of the liquid crystal of the liquid crystal layer 30 is matched between the second electrode 12 and the opposing electrode 21. In other words, the fluctuation of the alignment of the liquid crystal of the liquid crystal layer 30 between the second electrode 12 and the opposing electrode 21 is suppressed.

It is considered that the suppression of the alignment disorder AD of the liquid crystal by the driving method of the embodiment is caused by the fluctuation of the alignment of the liquid crystal between the second electrode 12 and the opposing electrode 21 being suppressed prior to the change of the alignment of the liquid crystal due to the application of the fourth voltage V4.

When evaluating the characteristics of the liquid crystal lens device, the inventor of the application discovered that there are cases where the degree of the alignment disorder AD is large and there are cases where the degree of the alignment disorder AD is small. Then, as experiments were performed, it was discovered that there seemed to be a relationship between the alignment disorder AD and the timing when the voltages are applied. Then, as a result of performing investigations of the driving conditions of the drive unit 77, the conditions at which the alignment disorder AD can be reduced were discovered. Namely, it was discovered that the alignment disorder AD can be suppressed by starting the application of the fourth voltage V4 after starting the application of the second voltage V2. This effect was first discovered by the experiments and the investigations of the inventor of the application. When these conditions are used, the alignment of the liquid crystal due to the application of the fourth voltage V4 is changed after the change of the alignment of the liquid crystal due to the application of the second voltage V2. It is considered that the occurrence of the alignment disorder AD can be suppressed at this time. This effect was first discovered by the experiments and the investigations of the inventor of the application.

In the liquid crystal optical unit 111 according to the embodiment, the distance along the X-axis direction between the first electrode 11 and the second electrode 12 is not less than 5 μm and not more than 150 μm. By the distance being not less than 5 μm, for example, contact between the first electrode 11 and the second electrode 12 can be suppressed; and the first electrode 11 and the second electrode 12 can be appropriately manufactured. By the distance being not more than 150 μm, for example, the electric field that is created by the first electrode 11 can be appropriately applied to the liquid crystal between the second electrode 12 and the opposing electrode 21.

FIG. 6A to FIG. 6D are graphs showing other characteristics of the liquid crystal lens device and the image display apparatus according to the first embodiment.

In FIG. 6A to FIG. 6D, the vertical axes and the horizontal axes are the same as the vertical axes and the horizontal axes of FIG. 2A to FIG. 2D.

In this example as shown in FIG. 6A to FIG. 6D, the start of the application of the second voltage V2 and the start of the application of the fourth voltage V4 are substantially simultaneous. The time difference between the start of the application of the second voltage V2 and the start of the application of the fourth voltage V4 is, for example, not more than 10 milliseconds. Namely, a time difference between a timing of a change in the voltage between the first electrode 11 and the first opposing electrode 21 and a timing of change in the voltage between the second electrode 12 and the first opposing electrode 21 is not more than 10 milliseconds.

As described above, the response time $\tau(V2)$ and the response time $\tau(V4)$ depend on the second voltage V2 and the fourth voltage V4 that are applied; and the response time $\tau(V2)$ is shorter than the response time $\tau(V4)$.

Accordingly, in the case where the difference between the response time $\tau(V4)$ and the response time $\tau(V2)$ is sufficiently large (e.g., not less than 200 milliseconds), the start of the application of the second voltage V2 and the start of the application of the fourth voltage V4 may be substantially simultaneous. In the case where the application of the second voltage V2 and the application of the fourth voltage V4 are started substantially simultaneously, the necessary difference between the response time $\tau(V4)$ and the response time $\tau(V2)$ changes due to, for example, the material of the liquid crystal, the thickness of the liquid crystal layer 30, the values of the voltages that are applied, etc.

Also, the application of the second voltage V2 may be started after starting the application of the fourth voltage V4. In such a case, the time difference $\Delta t$ is set to satisfy the relationship of $\Delta t < \tau(V4) - \tau(V2)$. Thereby, even in the case where the application of the fourth voltage V4 is started first, the alignment of the liquid crystal due to the application of the fourth voltage V4 can be changed after the change of the alignment of the liquid crystal due to the application of the second voltage V2. In the liquid crystal lens device 211 and the image display apparatus 311, high display quality can be obtained.

Figure 7:
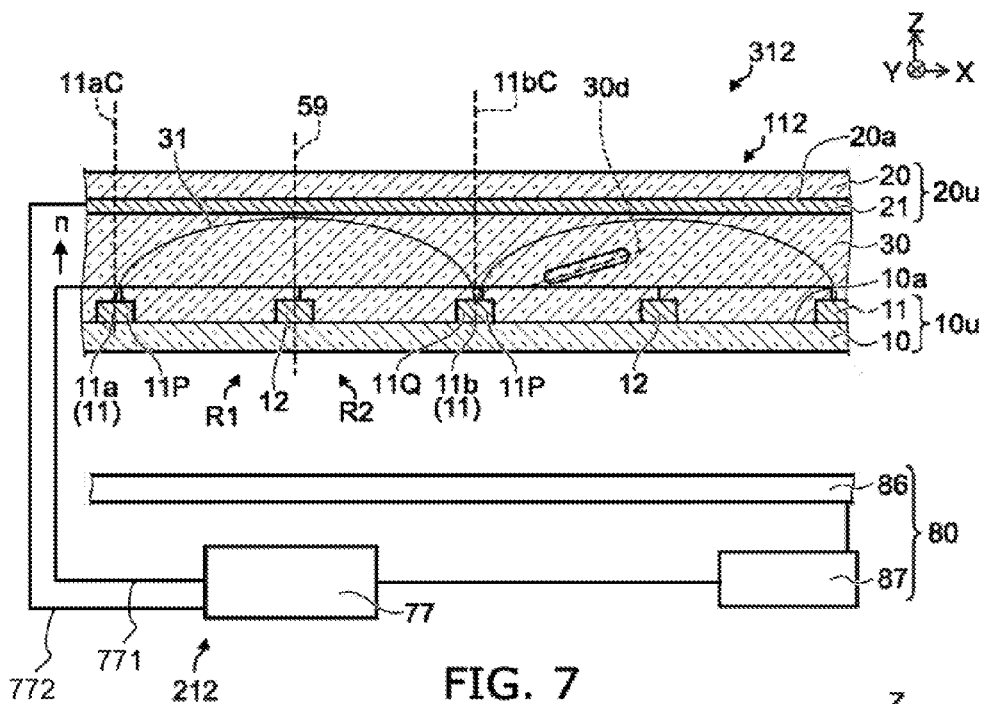
FIG. 7 is a schematic cross-sectional view showing another liquid crystal lens device and image display apparatus according to the first embodiment.

FIG. 7 is a schematic cross-sectional view showing another liquid crystal lens device and image display apparatus according to the first embodiment.

In the image display apparatus 312 of this example as shown in FIG. 7, one second electrode 12 is provided between the first major electrode 11a and the second major electrode 11b of a liquid crystal optical unit 112 of the liquid crystal lens device 212. The second electrode 12 is disposed at a position overlapping the central axis 59 when projected onto the X-Y plane. For example, the center of the second electrode 12 in the X-axis direction overlaps the central axis 59 when projected onto the X-Y plane.

In the liquid crystal lens device 212 and the image display apparatus 312 as well, high display quality can be obtained by changing the alignment of the liquid crystal due to the application of the fourth voltage V4 after the change of the alignment of the liquid crystal due to the application of the second voltage V2. The position where the second electrode 12 is disposed may be any position between the first major electrode 11a and the second major electrode 11b that is affected by the electric field due to the application of the second voltage V2.

In this example, the absolute value of the fourth voltage V4 may be substantially the same as the absolute value of the third voltage V3. For example, the second voltage V2 is 6 V; and the fourth voltage V4 is 0 V. In such a case, an alignment in which the tilt angle of the liquid crystal is large is formed in the liquid crystal layer 30 in the region where the second voltage V2 is applied; and the initial alignment or an alignment that is near the initial alignment is formed in the liquid crystal layer 30 in the region between the first major electrode 11a and the second major electrode 11b. Thereby, a refractive index distribution 31 having a convex lens configuration is formed in the liquid crystal layer 30.

Second Embodiment

Figure 8:
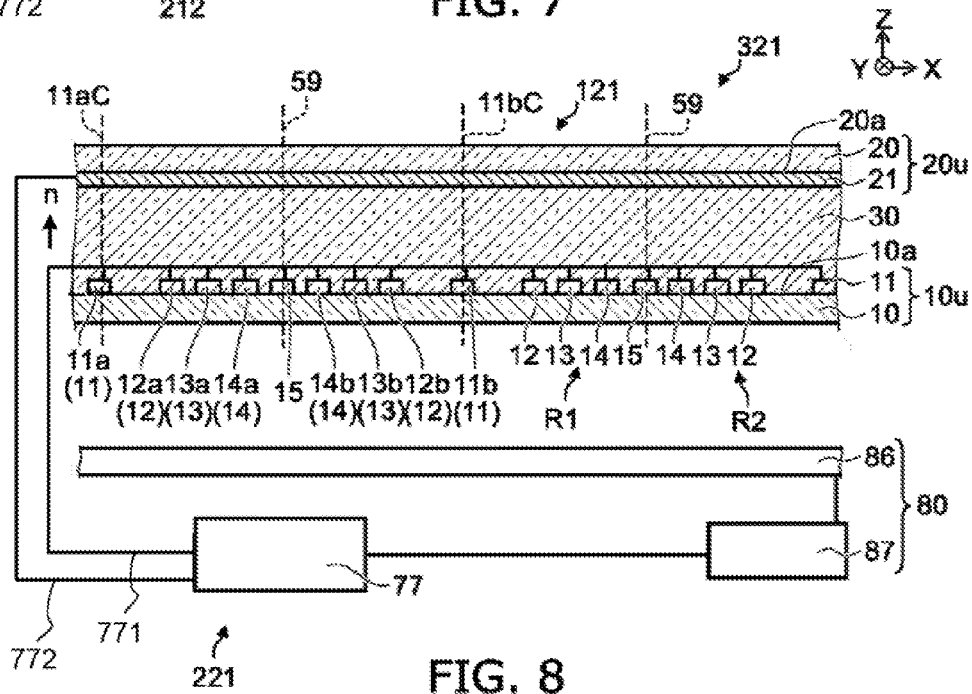
FIG. 8 is a schematic cross-sectional view showing a liquid crystal lens device and an image display apparatus according to a second embodiment.

FIG. 8 is a schematic cross-sectional view showing a liquid crystal lens device and an image display apparatus according to a second embodiment.

In the image display apparatus 321 according to the embodiment as shown in FIG. 8, a liquid crystal optical unit 121 of the liquid crystal lens device 221 further includes third electrodes 13, fourth electrodes 14, and a fifth electrode 15. Each of the third electrodes 13, the fourth electrodes 14, and the fifth electrode 15 extends along the Y-axis direction.

The third electrodes 13 include a third sub electrode 13a and a fourth sub electrode 13b. The third sub electrode 13a is provided between the first sub electrode 12a and the central axis 59. The fourth sub electrode 13b is provided between the second sub electrode 12b and the central axis 59.

The fourth electrodes 14 include a fifth sub electrode 14a and a sixth sub electrode 14b. The fifth sub electrode 14a is provided between the third sub electrode 13a and the central axis 59. The sixth sub electrode 14b is provided between the fourth sub electrode 13b and the central axis 59.

The fifth electrode 15 is provided between the fifth sub electrode 14a and the sixth sub electrode 14b. In this example, the fifth electrode 15 overlaps the central axis 59 when projected onto the X-Y plane. For example, the X-axis direction center of the fifth electrode 15 overlaps the central axis 59 when projected onto the X-Y plane.

The drive unit 77 is electrically connected to the first electrodes 11, the second electrodes 12, the third electrodes 13, the fourth electrodes 14, and the fifth electrode 15 through line 771, and the opposing electrode 21 through line 772.

The drive unit 77 applies a fifth voltage V5 and a sixth voltage V6 between the third electrode 13 and the opposing electrode 21. The absolute value of the sixth voltage V6 is greater than the absolute value of the fifth voltage V5. A voltage $V_{13}$ between the third electrode 13 and the opposing electrode 21 is controlled between the fifth voltage V5 and the sixth voltage V6 by the drive unit 77.

The drive unit 77 applies a seventh voltage V7 and an eighth voltage V8 between the fourth electrode 14 and the opposing electrode 21. The absolute value of the eighth voltage V8 is greater than the absolute value of the seventh voltage V7. A voltage $V_{14}$ between the fourth electrode 14 and the opposing electrode 21 is controlled between the seventh voltage V7 and the eighth voltage V8 by the drive unit 77.

The drive unit 77 applies a ninth voltage V9 between the fifth electrode 15 and the opposing electrode 21. The drive unit 77 maintains a voltage $V_{15}$ between the fifth electrode 15 and the opposing electrode 21 at the ninth voltage V9. In this example, the ninth voltage V9 is, for example, 0 V.

The drive unit 77 causes the absolute value of the second voltage V2 to be greater than the absolute value of the fourth voltage V4. The absolute value of the fourth voltage V4 is greater than the absolute value of the sixth voltage V6. The absolute value of the sixth voltage V6 is greater than the absolute value of the eighth voltage V8. The absolute value of the eighth voltage V8 is greater than the absolute value of the ninth voltage V9. In other words, the absolute value of the second voltage V2, the absolute value of the fourth voltage V4, the absolute value of the sixth voltage V6, the absolute value of the eighth voltage V8, and the absolute value of the ninth voltage V9 satisfy V2>V4>V6>V8>V9.

FIG. 9A to FIG. 9E are graphs showing characteristics of the liquid crystal lens device and the image display apparatus according to the second embodiment.

Figure 9:
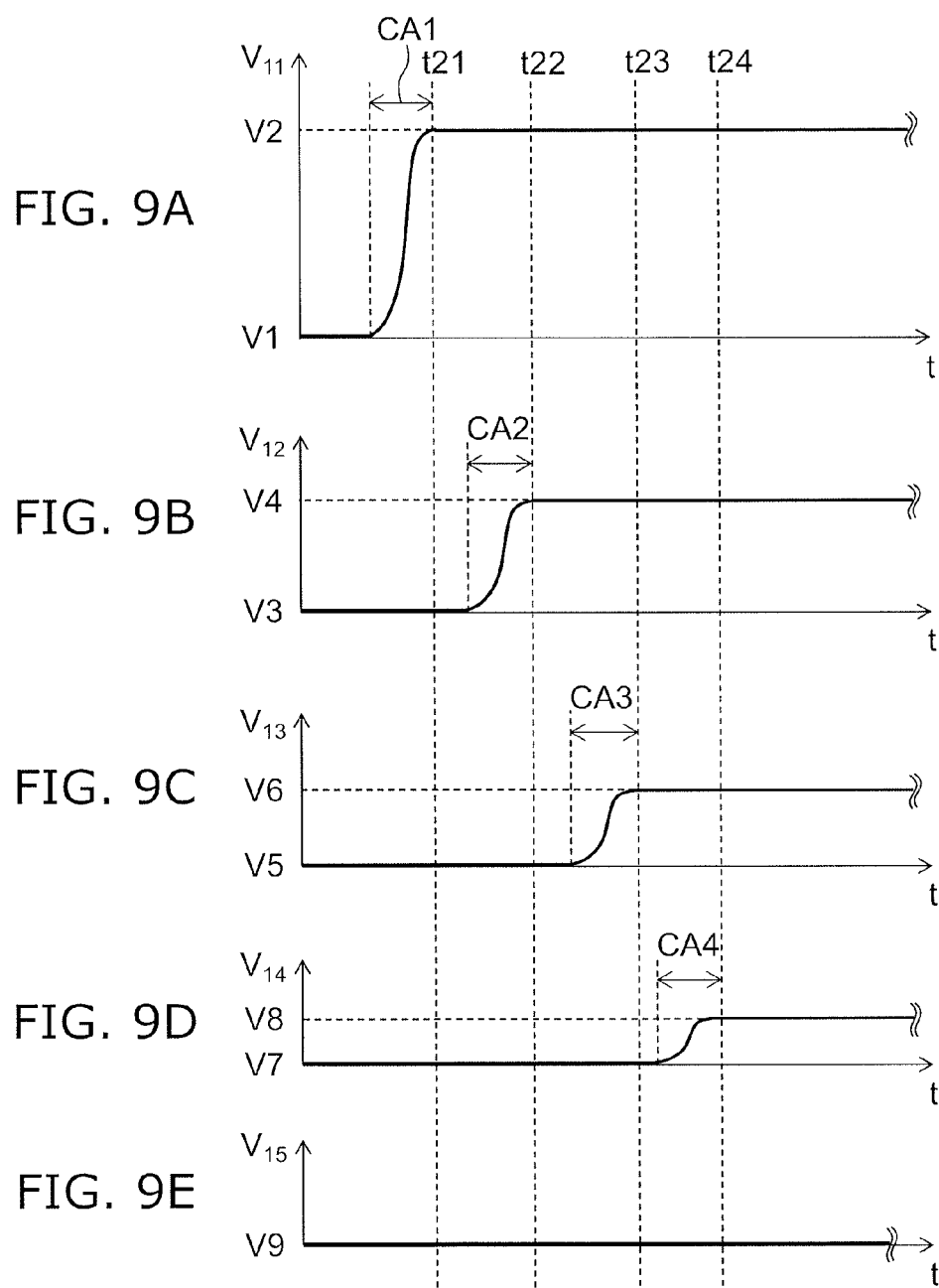
FIG. 9A to FIG. 9E are graphs showing characteristics of the liquid crystal lens device and the image display apparatus according to the second embodiment.
Figure 10:
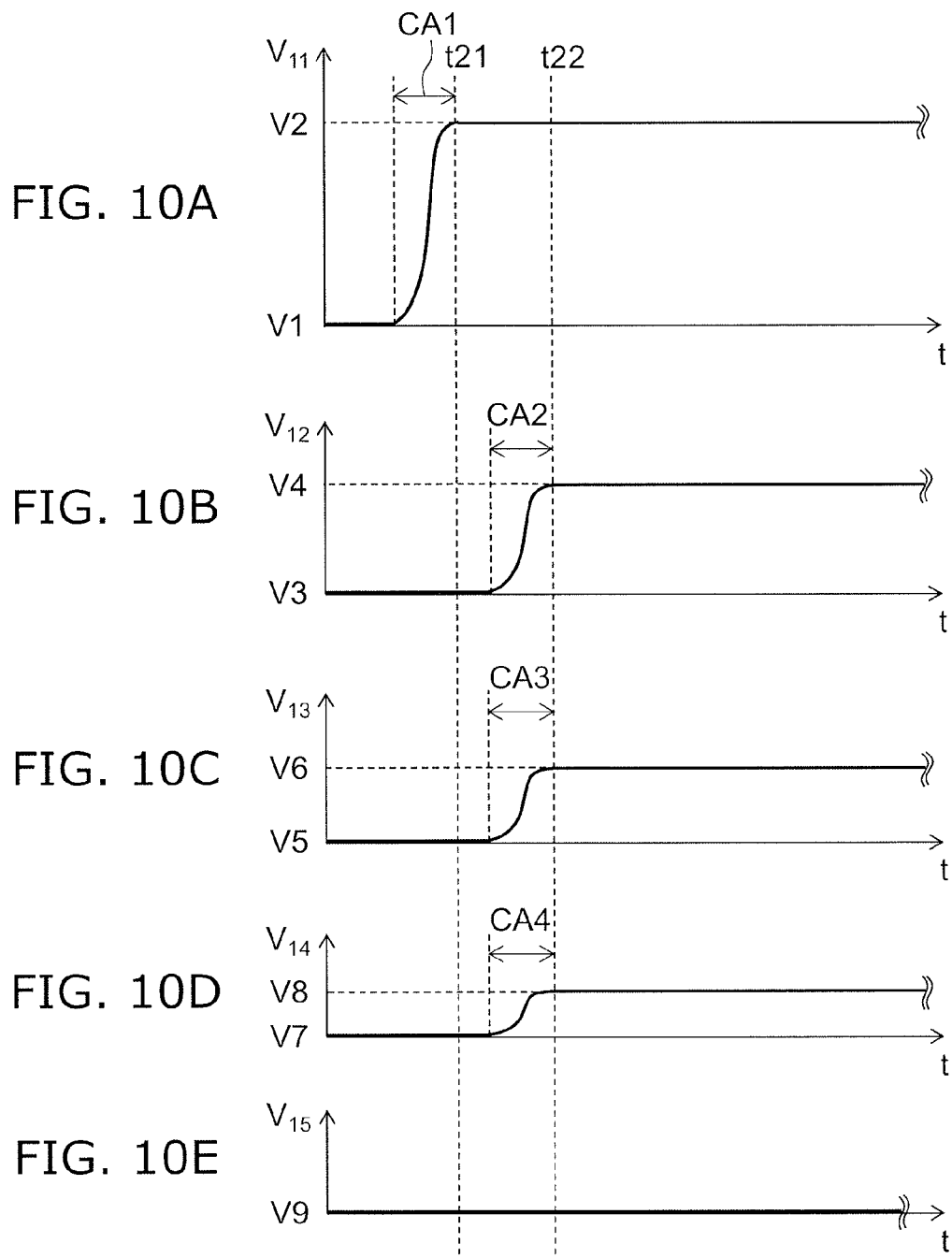
FIG. 10A to FIG. 10E are graphs showing other characteristics of the liquid crystal lens device and the image display apparatus according to the second embodiment.

In FIG. 9A, the vertical axis is the voltage $V_{11}$ applied between the first electrode 11 and the opposing electrode 21; and the horizontal axis is the time t.

In FIG. 9B, the vertical axis is the voltage $V_{12}$ applied between the second electrode 12 and the opposing electrode 21; and the horizontal axis is the time t.

In FIG. 9C, the vertical axis is the voltage $V_{13}$ applied between the third electrode 13 and the opposing electrode 21; and the horizontal axis is the time t.

In FIG. 9D, the vertical axis is the voltage $V_{14}$ applied between the fourth electrode 14 and the opposing electrode 21; and the horizontal axis is the time t.

In FIG. 9E, the vertical axis is the voltage $V_{15}$ applied between the fifth electrode 15 and the opposing electrode 21; and the horizontal axis is the time t.

In the case where the drive unit 77 forms the refractive index distribution 31 in the liquid crystal layer 30 as shown in FIG. 9A to FIG. 9E, the drive unit 77 starts the application of the fourth voltage V4 after starting the application of the second voltage V2. The drive unit 77 starts the application of the sixth voltage V6 after starting the application of the fourth voltage V4. Then, the drive unit 77 starts the application of the eighth voltage V8 after starting the application of the sixth voltage V6.

The drive unit 77 changes the voltage between the second electrode 12 and the first opposing electrode 21 from the third voltage V3 to the fourth voltage V4, after the drive unit 77 changes the voltage between the first electrode 11 and the first opposing electrode 21 from the first voltage V1 to the second voltage V2. The drive unit 77 changes the voltage between the third electrode 13 and the first opposing electrode 21 from the fifth voltage V5 to the sixth voltage V6, after the drive unit 77 changes the voltage between the second electrode 12 and the first opposing electrode 21 from the third voltage V3 to the fourth voltage V4. The drive unit 77 changes the voltage between the fourth electrode 14 and the first opposing electrode 21 from the seventh voltage V7 to the eighth voltage V8, after the drive unit 77 changes the voltage between the third electrode 13 and the first opposing electrode 21 from the fifth voltage V5 to the sixth voltage V6.

The change between the fifth voltage V5 and the sixth voltage V6 corresponds to a third change interval CA3. In the third change interval CA3, the voltage $V_{13}$ changes continuously from the fifth voltage V5 toward the sixth voltage V6. The change between the seventh voltage V7 and the eighth voltage V8 corresponds to a fourth change interval CA4. In the fourth change interval CA4, the voltage $V_{14}$ changes continuously from the seventh voltage V7 toward the eighth voltage V8.

For example, the start of the application of the second voltage V2 is a timing t21 when the first change interval CA1 ends and the voltage $V_{11}$ reaches the second voltage V2. For example, the start of the application of the fourth voltage V4 is a timing t22 when the second change interval CA2 ends and the voltage $V_{12}$ reaches the fourth voltage V4. For example, the start of the application of the sixth voltage V6 is a timing t23 when the third change interval CA3 ends and the voltage $V_{13}$ reaches the sixth voltage V6. For example, the start of the application of the eighth voltage V8 is a timing t24 when the fourth change interval CA4 ends and the voltage $V_{14}$ reaches the eighth voltage V8.

The drive unit 77 provides the timing t22 after the timing t21. The drive unit 77 provides the timing t23 after the timing t22. The drive unit 77 provides the timing t24 after the timing t23. The drive unit 77 provides the second change interval CA2 after the first change interval CA1. The drive unit 77 provides the third change interval CA3 after the second change interval CA2. The drive unit 77 provides the fourth change interval CA4 after the third change interval CA3.

The drive unit 77 changes the alignment of the liquid crystal due to the application of the fourth voltage V4 after the change of the alignment of the liquid crystal due to the application of the second voltage V2 by applying the first voltage V1 to the ninth voltage V9 as recited above. The drive unit 77 changes the alignment of the liquid crystal due to the application of the sixth voltage V6 after the change of the alignment of the liquid crystal due to the application of the fourth voltage V4. Then, the drive unit 77 changes the alignment of the liquid crystal due to the application of the eighth voltage V8 after the change of the alignment of the liquid crystal due to the application of the sixth voltage V6.

Thereby, in the liquid crystal lens device 221 and the image display apparatus 321 according to the embodiment as well, high display quality can be obtained. As recited above, the occurrence of the alignment disorder AD can be suppressed more appropriately by applying the voltages in order from the high voltage.

FIG. 10A to FIG. 10E are graphs showing other characteristics of the liquid crystal lens device and the image display apparatus according to the second embodiment.

In FIG. 10A to FIG. 10E, the vertical axes and the horizontal axes are the same as those of FIG. 9A to FIG. 9E.

In this example as shown in FIG. 10A to FIG. 10E, in the case where the drive unit 77 forms the refractive index distribution 31 in the liquid crystal layer 30, the drive unit 77 starts the application of the fourth voltage V4, the application of the sixth voltage V6, and the application of the eighth voltage V8 substantially simultaneously after starting the application of the second voltage V2. The absolute value of the time difference between the start of the application of the fourth voltage V4 and the start of the application of the sixth voltage V6 is, for example, not more than 10 milliseconds. The absolute value of the time difference between the start of the application of the sixth voltage V6 and the start of the application of the eighth voltage V8 is, for example, not more than 10 milliseconds. The time difference between the start of the application of the fourth voltage V4 and the start of the application of the eighth voltage V8 is, for example, not more than 10 milliseconds. Namely, the time difference between a timing of a change in the voltage between the second electrode 12 and the first opposing electrode 21 and a timing of change in the voltage between the third electrode 13 and the first opposing electrode 21 is not more than 10 milliseconds.

Even in the case where the first voltage V1 to the ninth voltage V9 are applied as shown in FIG. 10A to FIG. 10E, high display quality can be obtained. In other words, in the case where the third electrodes 13 are further provided, it is sufficient for the start of the application of the sixth voltage V6 to be after the start of the application of the second voltage V2. In the case where the fourth electrodes 14 are further provided, it is sufficient for the start of the application of the eighth voltage V8 to be after the start of the application of the second voltage V2.

Third Embodiment

Figure 11:
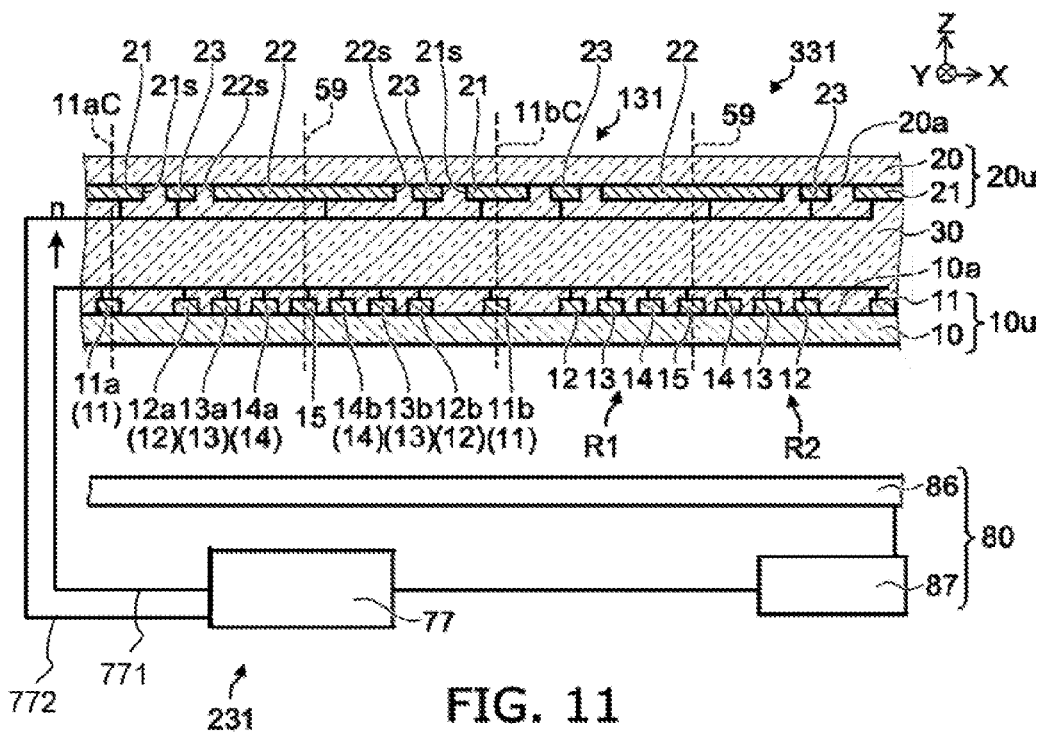
FIG. 11 is a schematic cross-sectional view showing a liquid crystal lens device and an image display apparatus according to a third embodiment.

FIG. 11 is a schematic cross-sectional view showing a liquid crystal lens device and an image display apparatus according to a third embodiment.

In the liquid crystal lens device 231 of the image display apparatus 331 according to the embodiment as shown in FIG. 11, the configuration of the second substrate unit 20u of a liquid crystal optical unit 131 differs from the configuration of the second substrate unit 20u of the embodiments recited above. In this example, the second substrate unit 20u includes the multiple first opposing electrodes 21, multiple second opposing electrodes 22, and multiple third opposing electrodes 23.

The multiple first opposing electrodes 21 are provided on the second major surface 20a. The multiple first opposing electrodes 21 extend in the Y-axis direction and are arranged in a direction non-parallel to the Y-axis direction. The multiple first opposing electrodes 21 are arranged, for example, in the X-axis direction. The multiple first opposing electrodes 21 oppose the multiple first electrodes 11.

The multiple second opposing electrodes 22 are provided respectively in each space between the multiple first opposing electrodes 21 on the second major surface 20a. The multiple second opposing electrodes 22 oppose the multiple third electrodes 13, the multiple fourth electrodes 14, and the multiple fifth electrodes 15.

The multiple third opposing electrodes 23 are provided respectively in each space between the multiple first opposing electrodes 21 and the multiple second opposing electrodes 22 on the second major surface 20a. The multiple third opposing electrodes 23 oppose the multiple second electrodes 12.

A first separating region 21s is provided between the first opposing electrode 21 and the third opposing electrode 23. The first separating region 21s extends in the Y-axis direction. The first separating region 21s is, for example, a slit extending along the Y-axis direction. The first separating region 21s opposes, for example, at least a portion of the region between the first electrode 11 and the second electrode 12.

A second separating region 22s is provided between the second opposing electrode 22 and the third opposing electrode 23. The second separating region 22s extends in the Y-axis direction. The second separating region 22s is, for example, a slit extending along the Y-axis direction. The second separating region 22s opposes, for example, at least a portion of the region between the second electrode 12 and the third electrode 13.

The first separating region 21s and the second separating region 22s are provided, for example, proximally to the region directly above the second electrode 12. The first separating region 21s and the second separating region 22s are provided, for example, proximally to the second electrode 12 when projected onto the X-Y plane.

For example, the first opposing electrodes 21, the second opposing electrodes 22, and the third opposing electrodes 23 are electrically connected. The potential of the first opposing electrodes 21, the potential of the second opposing electrodes 22, and the potential of the third opposing electrodes 23 are set to be substantially the same potential.

In the liquid crystal lens device 231 and the image display apparatus 331 according to the embodiment as well, high display quality can be obtained by applying the first voltage V1 to the ninth voltage V9 by the method described in regard to FIG. 9A to FIG. 9E or FIG. 10A to FIG. 10E. In the liquid crystal lens device 231 and the image display apparatus 331, the refractive index distribution 31 having the Fresnel lens-like configuration can be more appropriately formed in the liquid crystal layer 30 by providing the first separating region 21s and the second separating region 22s.

Figure 12:
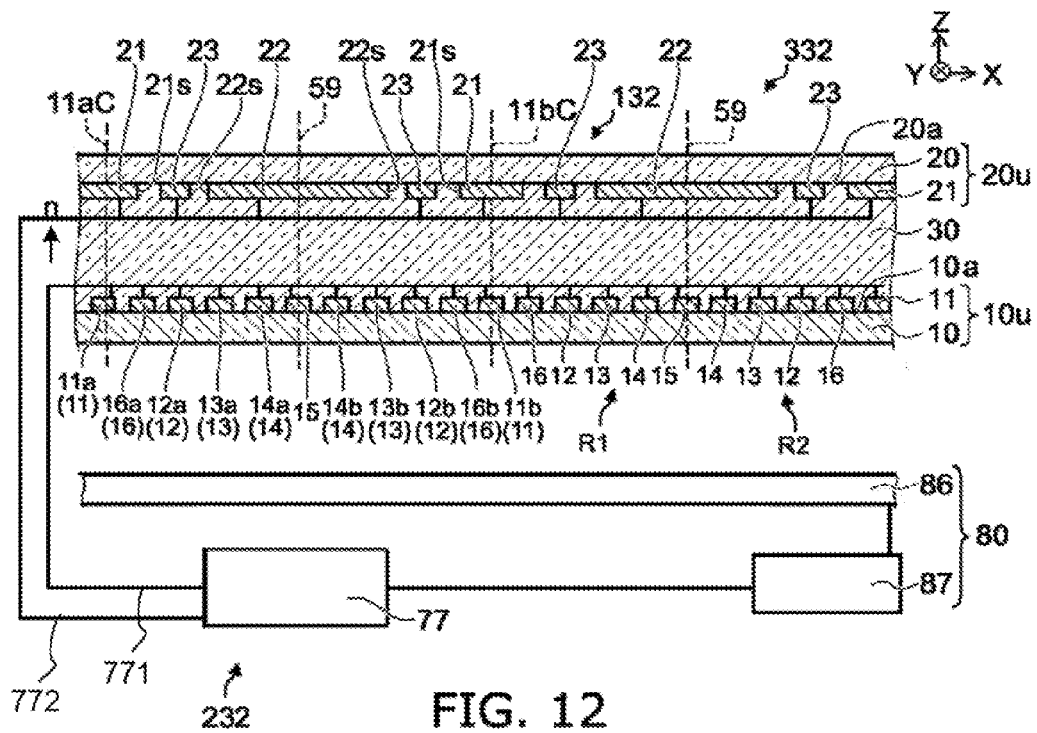
FIG. 12 is a schematic cross-sectional view showing another liquid crystal lens device and image display apparatus according to the third embodiment.

FIG. 12 is a schematic cross-sectional view showing another liquid crystal lens device and image display apparatus according to the third embodiment.

In the liquid crystal lens device 232 of the image display apparatus 332 of this example as shown in FIG. 12, the first substrate unit 10u of a liquid crystal optical unit 132 further includes sixth electrodes 16. The sixth electrodes 16 extend along the Y-axis direction.

The sixth electrodes 16 include a seventh sub electrode 16a and an eighth sub electrode 16b. The seventh sub electrode 16a is provided between the first major electrode 11a and the first sub electrode 12a. The eighth sub electrode 16b is provided between the second major electrode 11b and the second sub electrode 12b.

The drive unit 77 also is electrically connected to the sixth electrodes 16 through line 771.

The drive unit 77 applies a tenth voltage V10 and the eleventh voltage V11 between the sixth electrode 16 and the first opposing electrode 21. The first opposing electrode 21 has the same potential as the second opposing electrode 22 and the third opposing electrode 23. Accordingly, the voltage between the sixth electrode 16 and the first opposing electrode 21, the voltage between the sixth electrode 16 and the second opposing electrode 22, and the voltage between the sixth electrode 16 and the third opposing electrode 23 are substantially the same. The relationship between these voltages is the same as that of the first electrode 11 to the fifth electrode 15. To simplify the description of the voltages hereinbelow, the electrodes on the second substrate unit 20u side are described as the first opposing electrode 21.

The absolute value of the eleventh voltage V11 is greater than the absolute value of the tenth voltage V10. A voltage $V_{16}$ between the sixth electrode 16 and the first opposing electrode 21 is changed between the tenth voltage V10 and the eleventh voltage V11 by the drive unit 77. The drive unit 77 causes the absolute value of the fourth voltage V4 to be greater than the absolute value of the eleventh voltage V11. In other words, the voltage applied to the sixth electrode 16 is lower than the voltage applied to the second electrode 12.

In the liquid crystal lens device 232 and the image display apparatus 332 as well, high display quality can be obtained by applying the voltages in order from the high voltage as described in regard to FIG. 9A to FIG. 9E. Also, the occurrence of the alignment disorder AD can be suppressed more appropriately by providing the sixth electrodes 16 and setting the voltage applied to the sixth electrodes 16 to be lower than the voltage applied to the second electrodes 12. The display quality is increased further.

Fourth Embodiment

Figure 13:
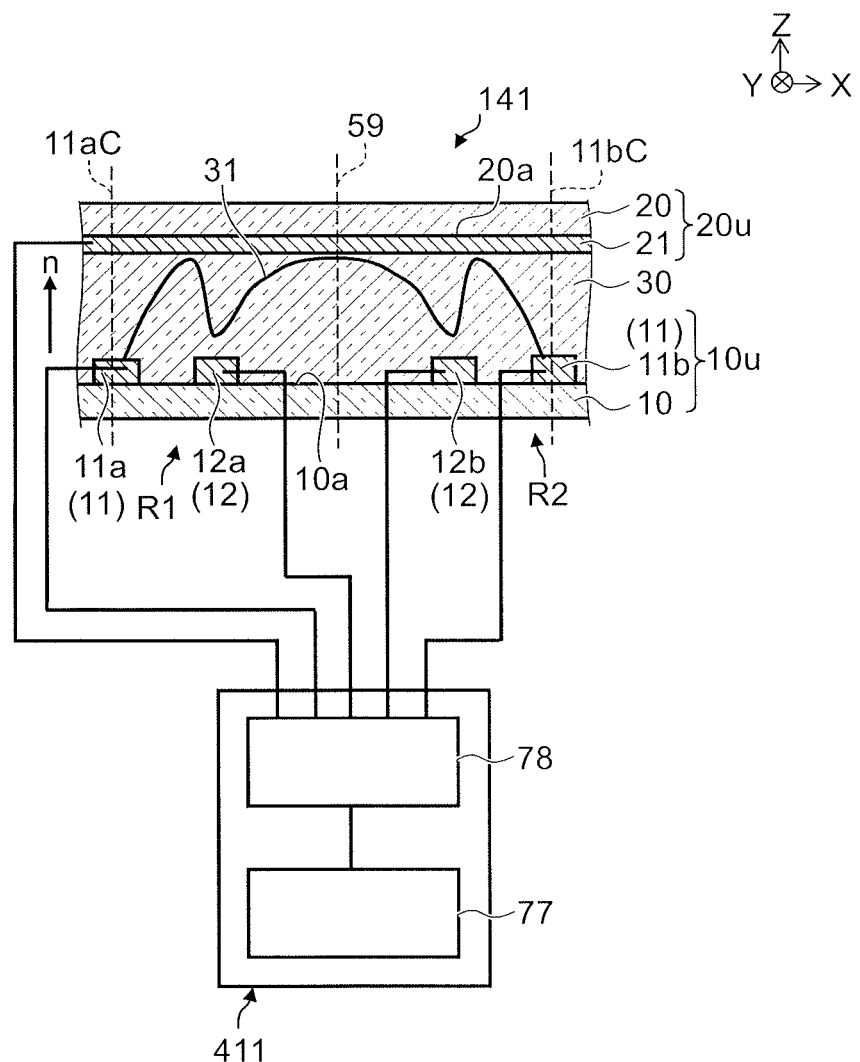
FIG. 13 is a schematic cross-sectional view showing a drive device according to a fourth embodiment.

FIG. 13 is a schematic cross-sectional view showing a drive device according to a fourth embodiment.

As shown in FIG. 13, the drive device 411 includes the drive unit 77 and a connection unit 78.

The drive unit 77 may include the drive units described in the embodiments recited above. The connection unit 78 is electrically connected to a liquid crystal optical unit 141. The liquid crystal optical unit 141 may include the liquid crystal optical unites described in the embodiments recited above. For example, the connection unit 78 is electrically connected to the first electrodes 11, the second electrodes 12, and the opposing electrode 21. For example, the connection unit 78 is connectors and/or interconnects to obtain the electrical connection with the liquid crystal optical unit 141. The connection unit 78 is electrically connected to the drive unit 77. The drive unit 77 is electrically connected to the liquid crystal optical unit 141 via the connection unit 78. The electrical connection between the connection unit 78 and the liquid crystal optical unit 141 may be switched between the connection state and the non-connection state by a connector, etc.

In the drive device 411, the drive unit 77 starts the application of the fourth voltage V4 after starting the application of the second voltage V2 and changes the alignment of the liquid crystal due to the application of the fourth voltage V4 after changing the alignment of the liquid crystal due to the application of the second voltage V2. Thereby, the display quality of the liquid crystal optical unit 141 that is connected can be increased.

In the embodiments recited above, a state is shown in which the absolute values (the effective values) of the first voltage V1 to the ninth voltage V9 are constant. The absolute values of the first voltage V1 to the ninth voltage V9 may change temporally.

According to the embodiments, a liquid crystal lens device, an image display apparatus, and a drive device that provide a high-quality display can be provided.

In the specification of the application, "perpendicular" and "parallel" refer to not only strictly perpendicular and strictly parallel but also include, for example, the fluctuation due to manufacturing processes, etc.; and it is sufficient to be substantially perpendicular and substantially parallel. In the specification of the application, the state of being provided on a component includes not only the state of being provided in direct contact with the component but also the state of being provided with another component inserted therebetween. The state of being stacked includes not only the state of overlapping in contact with each other but also the state of overlapping with another component inserted therebetween. The state of being opposed includes not only the state of directly facing each other but also the state of facing each other with another component being inserted therebetween.

Hereinabove, exemplary embodiments of the invention are described with reference to specific examples. However, the invention is not limited to these specific examples. For example, one skilled in the art may similarly practice the invention by appropriately selecting specific configurations of components included in liquid crystal lens devices, image display apparatuses, and drive devices such as liquid crystal optical unites, drive units, display units, image display units, connection units, first substrate units, second substrate units, liquid crystal layers, first substrates, second substrates, first electrodes, second electrodes, third electrodes, opposing electrodes, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal lens devices, image display apparatuses, and drive devices practicable by an appropriate design modification by one skilled in the art based on the liquid crystal lens devices, image display apparatuses, and drive devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal lens device, comprising:
   a liquid crystal optical unit including
      a first substrate unit including
         a first substrate having a first major surface,
         a plurality of first electrodes, each of the first electrodes being provided on the first major surface to extend in a first direction and being arranged in a direction non-parallel to the first direction, and
         a plurality of second electrodes, a pair of the second electrodes adjacent to each other being provided on the first major surface between two of the first electrodes most proximal to each other to extend in the first direction and being separated from the first electrodes in a second direction perpendicular to the first direction,
      a second substrate unit including
         a second substrate having a second major surface opposing the first major surface, and
         a first opposing electrode provided on the second major surface, and
      a liquid crystal layer provided between the first substrate unit and the second substrate unit; and
   a drive unit configured to control a voltage between the first electrodes and the first opposing electrode and a voltage between the second electrodes and the first opposing electrode, the drive unit changing the voltage between the second electrodes and the first opposing electrode from a third voltage to a fourth voltage after changing the voltage between the first electrodes and the first opposing electrode from a first voltage to a second voltage, the absolute value of the second voltage being greater than the absolute value of the first voltage, the absolute value of the fourth voltage being greater than the absolute value of the third voltage.

2. The device according to claim 1, wherein the absolute value of the second voltage is greater than the absolute value of the fourth voltage.

3. The device according to claim 1, wherein
a response time $\tau(V2)$ is represented by

[Formula 1]

$$\tau(V2) = \frac{d^2\gamma}{\varepsilon_0\Delta\varepsilon V2^2 - \pi^2 K}, \quad (1)$$

a response time $\tau(V4)$ is represented by

[Formula 2]

$$\tau(V4) = \frac{d^2\gamma}{\varepsilon_0\Delta\varepsilon V4^2 - \pi^2 K}, \text{ and} \quad (2)$$

a time difference $\Delta t$ satisfies the relationship of $\Delta t \geq \tau(V4) - \tau(V2)$,
where a thickness of the liquid crystal layer is d (meters),
a rotational viscosity coefficient of a liquid crystal included in the liquid crystal layer is $\gamma$ (pascals·seconds),
the dielectric constant of a vacuum is $\varepsilon_0$ (farads/meter),
the absolute value of a dielectric anisotropy of the liquid crystal layer is $\Delta\varepsilon$,
an elasticity modulus of splay is K (newtons),
the second voltage is V2 (volts),
the fourth voltage is V4 (volts),
a response time of a change of an alignment of the liquid crystal of the liquid crystal layer due to the application of the second voltage is $\tau(V2)$ (seconds),
a response time of the change of the alignment of the liquid crystal due to the application of the fourth voltage is $\tau(V4)$ (seconds), and
a time difference between a timing of a change in the voltage between the first electrodes and the first opposing electrode and a timing of change in the voltage between the second electrodes and the first opposing electrode is $\Delta t$.

4. The device according to claim 1, wherein
one of the second electrodes is provided between a central axis and one of two most proximal first electrodes when projected onto a plane parallel to the first direction and the second direction, the central axis being parallel to the first direction to pass through a midpoint of a line segment connecting a center of the one of the two most proximal first electrodes to a center of the other of the two most proximal first electrodes, and
a distance along the second direction between the one of the second electrodes and the one of the two most proximal first electrodes is not more than 150 μm.

5. The device according to claim 1, wherein
one of the second electrodes is provided between a central axis and one of two most proximal first electrodes when projected onto a plane parallel to the first direction and the second direction, the central axis being parallel to the first direction to pass through a midpoint of a line segment connecting a center of the one of the two most proximal first electrodes to a center of the other of the two most proximal first electrodes, and
one other of the second electrodes is provided between the central axis and the other of the two most proximal first electrodes.

6. The device according to claim 1, wherein a dielectric anisotropy of a liquid crystal included in the liquid crystal layer is positive.

7. An image display apparatus, comprising:
the liquid crystal lens device according to claim 1; and
an image display unit stacked with the liquid crystal lens device, the image display unit including a display unit configured to emit light including image information to be incident on the liquid crystal layer.

8. A liquid crystal lens device, comprising:
a liquid crystal optical unit including
a first substrate unit including
a first substrate having a first major surface, a plurality of first electrodes, each of the first electrodes being provided on the first major surface to extend in a first direction and being arranged in a direction non-parallel to the first direction, and a plurality of second electrodes, a pair of the second electrodes adjacent to each other being provided on the first major surface between two of the first electrodes most proximal to each other to extend in the first direction and being separated from the first electrodes in a second direction perpendicular to the first direction, a second substrate unit including a second substrate having a second major surface opposing the first major surface, and a first opposing electrode provided on the second major surface, and a liquid crystal layer provided between the first substrate unit and the second substrate unit; and a drive unit configured to change a voltage between the first electrodes and the first opposing electrode from a first voltage to a second voltage and change a voltage between the second electrodes and the first opposing electrode from a third voltage to a fourth voltage, the absolute value of the second voltage being greater than the absolute value of the first voltage, the absolute value of the fourth voltage being greater than the absolute value of the third voltage, the drive unit changing an alignment of a liquid crystal of the liquid crystal layer due to the application of the fourth voltage after changing the alignment of the liquid crystal of the liquid crystal layer due to the application of the second voltage.

9. The device according to claim 8, wherein a time difference between a timing of a change in the voltage between the first electrodes and the first opposing electrode and a timing of change in the voltage between the second electrodes and the first opposing electrode is not more than 10 milliseconds.

* * * * *